(12) United States Patent
Korcz (10) Patent No.: US 7,300,025 B2
(45) Date of Patent: Nov. 27, 2007

(54) MOUNTING BRACKET FOR AN ELECTRICAL DEVICE

(75) Inventor: Krzysztof W. Korcz, Granger, IN (US)

(73) Assignee: Hubbell Incorporated, Orange, CT (US)

( * ) Notice: Subject to any disclaimer, the term of this patent is extended or adjusted under 35 U.S.C. 154(b) by 4 days.

(21) Appl. No.: 11/359,767

(22) Filed: Feb. 23, 2006

(65) Prior Publication Data

US 2007/0194180 A1    Aug. 23, 2007

(51) Int. Cl.
*F16L 5/00*     (2006.01)
(52) U.S. Cl. .................. 248/56; 220/3.9; 248/906
(58) Field of Classification Search .............. 248/56, 248/309.1, 343, 342, 906; 220/3.5, 3.6, 3.7, 220/3.9; 174/58
See application file for complete search history.

(56) References Cited

U.S. PATENT DOCUMENTS

| | | | |
|---|---|---|---|
| 3,609,647 A | 9/1971 | Castellano | |
| 4,000,874 A | * 1/1977 | Finley et al. | 248/27.1 |
| 4,012,580 A | 3/1977 | Arnold | |
| 4,019,647 A | 4/1977 | Arnold | |
| 4,063,660 A | 12/1977 | Ware | |
| 4,183,486 A | 1/1980 | Esoldi | |
| 4,263,472 A | 4/1981 | Maheu | |
| 4,296,870 A | 10/1981 | Balkwill et al. | |
| 4,297,525 A | 10/1981 | Bowden, Jr. | |
| 4,328,903 A | 5/1982 | Baars | |
| 4,546,793 A | 10/1985 | Stupecky | |
| 4,638,963 A | 1/1987 | Hernandez | |
| 4,724,281 A | 2/1988 | Nix et al. | |
| 4,887,073 A | 12/1989 | Nakao et al. | |
| 4,988,067 A | * 1/1991 | Propp et al. | 248/343 |
| 4,993,575 A | 2/1991 | Maes | |
| 5,221,814 A | 6/1993 | Colbaugh et al. | |
| 5,347,088 A | 9/1994 | Marsh et al. | |
| 5,349,134 A | 9/1994 | Russell | |

(Continued)

FOREIGN PATENT DOCUMENTS

GB    2 260 452    4/1993

OTHER PUBLICATIONS

Product Catalog 2003, Arlington Industries, Inc., p. L-2.

*Primary Examiner*—Ramon O Ramirez
(74) *Attorney, Agent, or Firm*—Garrett V. Davis; Mark S. Bicks; Alfred N. Goodman (57) ABSTRACT

A mounting bracket is provided for mounting to an opening in a wall. The mounting bracket is for an electrical box or electrical device such as a switch, plug or fire alarm for mounting the electrical box or device to a wall without the need for an additional mounting structure. The mounting bracket includes a central opening for receiving the electrical device. At least two legs are integrally formed with a face plate of the bracket and bent perpendicular to the face plate to extend into an opening formed in the wall. A pivotal arm is mounted in each leg and coupled to a screw for limited pivotal movement to pivot the arms between a first retracted position and a second extended position to attach the mounting plate to the wall. The screw is rotated to draw the arm toward the face plate to contact the inner surface of the wall and draw the face plate into contact with the outer surface of the wall.

28 Claims, 8 Drawing Sheets

U.S. PATENT DOCUMENTS

| | | |
|---|---|---|
| 5,434,359 A | 7/1995 | Schnell |
| 5,448,011 A | 9/1995 | Laughlin |
| 5,603,424 A | 2/1997 | Bordwell et al. |
| 5,740,936 A | 4/1998 | Nash |
| 6,093,890 A | 7/2000 | Gretz |
| 6,102,360 A | 8/2000 | Clegg et al. |
| 6,170,685 B1 * | 1/2001 | Currier ................ 220/3.3 |
| 6,194,657 B1 | 2/2001 | Gretz |
| 6,229,087 B1 | 5/2001 | Archer |
| 6,346,674 B1 | 2/2002 | Gretz |
| 7,191,993 B2 * | 3/2007 | Bobrowski ............ 248/318 |
| 2006/0108362 A1 * | 5/2006 | Lalancette ............ 220/3.7 |

* cited by examiner

MOUNTING BRACKET FOR AN ELECTRICAL DEVICE

FIELD OF THE INVENTION

The present invention is directed to a mounting bracket for mounting an electrical device to a wall. In particular, the invention is directed to a mounting bracket received within an opening in an existing wall for supporting an electrical device.

BACKGROUND OF THE INVENTION

Wall mounted electrical boxes are commonly used in the building industry for electrical power outlets, light switches and the like. The electrical boxes can have various tabs or arms for attaching the box to the wall. Many variations exist with some designs being more effective than others.

One type of electrical box includes two pivotal arms that attach to the wall. The arms are often mounted at opposite corners of the box for supporting the sides of the box. An electrical wiring device is mounted within the box by threading screws within a base formed in the box. The pivotal arms can exhibit several problems when positioning the box in an opening in a wall or ceiling. The box can rock from side to side as a result of the positioning of the pivoting arms and the shape and dimension of the opening in the wall. The rocking motion can be eliminated by the shape of the opening which must typically be modified during installation of the box, thereby increasing the labor for the installer.

Various designs and shapes of electrical boxes have been proposed that include a pivoting arm. One example is disclosed in U.S. Pat. No. 6,170,685 to Currier, which discloses a folding electrical outlet box. The top and bottom walls of the box include a tunnel that has an outwardly open slot. A screw is threaded into the tunnel and into a rotating clip. The friction between the screw and clip causes the screw to rotate until some resistance is met. Continued rotation of the screw causes the clip to slide in the slot to secure the box to the wall.

Another electrical box having securing arms is disclosed in U.S. Pat. No. 5,434,359 to Schell. The electrical box has mounting surfaces or contacting points, a pair of bosses and a pair of securing arms. The contacting points are spaced apart along the top and bottom walls and are coplanar with the bosses and arms. The contacting points extend from the top and bottom surfaces a distance at least equal to the dimension of the bosses and securing arms. The bosses and securing arms contact the edges of the opening to prevent a side-to-side rocking motion of the box within the opening of the wall.

U.S. Pat. No. 6,102,360 to Clegg et al. discloses a faceplate with fastening devices for securing a wall opening. The fastening devices have rearward projecting flanges and legs. The flanges locate the faceplate relative to the opening in the wall and the legs serve to limit rotation of the fastener as the fasteners are rotated to bring the arms into contact with the back side of the wall structure.

U.S. Pat. No. 6,093,890 to Gretz discloses a mounting device for a low voltage wall device for communication cables, television cables and fiber optics. The device has a frame with an integral reinforcing flange to fit within a rectangular hole formed in the wall. A pair of rotating flags are mounted on the ends of screws for grabbing the rear surface of the wall. The screws are tightened to mount the device securely to the wall.

Another device is shown in U.S. Pat. No. 5,603,424 to Bordwell. This device is attachable to a premanufactured electrical box to mount the box to a wall. A pair of clip-on securement members are mounted on each side wall of the box. The securement members include a bracket and a brace supported on the bracket. The brace is movable on the bracket to clamp the box to the wall.

The prior devices are generally effective for the intended use. There is, however, a continuing need in the industry for improved mounting devices that overcome the limitations of the prior devices.

SUMMARY OF THE INVENTION

The present invention is directed to a mounting bracket for mounting to a wall. The invention is particularly directed to a mounting bracket for coupling to an opening in a wall for supporting an electrical device and/or electrical box to the wall without the need to attach the bracket directly to a stud or other support.

The mounting bracket of the invention is particularly suitable for mounting electrical switches and other electrical devices to a wall or ceiling without the need to attach the bracket or electrical box to a wall stud or other internal support. The bracket is inserted into an opening in the wall. The bracket includes a flange that contacts the outer surface of the wall and a plurality of movable mounting arms to engage the inner surface of the wall.

Accordingly, a primary aspect of the invention is to provide a mounting bracket that can be attached to a wall surface for supporting an electrical device.

Another aspect of the invention is to provide a mounting bracket for an electrical box and an electrical device that is formed from a single sheet of metal by stamping or punching.

A further aspect of the invention is to provide a mounting bracket for being received in an opening in a wall where the bracket includes a frame formed from a single piece of sheet material and has a pair of pivoting mounting arms for engaging the inner surface of the wall.

Another aspect of the invention is to provide a mounting bracket including a frame with integrally formed legs and pivoting arms coupled to the legs. The legs are movable from a retracted position to an extended position to clamp the frame to the face of a wall.

The mounting bracket of the invention has a one-piece support plate with a pair of U-shaped legs that are integrally formed with the support plate. A screw extends through an opening in the support plate and extends axially along the channel of the U-shaped legs. A pivoting mounting arm has a hole for receiving the screw so that the mounting arm is movable along the length of the leg by rotation of the screw. The mounting arm is mounted within the respective leg for limited rotational movement from a retracted position to an outwardly extended position for capturing a wall between the support plate and the mounting arms to attach the mounting bracket to the wall.

These and other aspects of the invention are basically attained by providing a mounting bracket for mounting an electrical device to a wall or ceiling. The mounting bracket comprises a one-piece support member having a face plate with a first planar surface for contacting an outer surface of a wall and for supporting the electrical device. The face plate has a central opening defining an inner edge of the face plate. At least two legs extend away from the face plate and are positioned on opposite sides of the central opening. The legs are integrally formed with the inner edge of the face plate.

A pivotally mounted arm is coupled to each of the legs. Each arm is movable between a first retracted position and a second extended position for engaging an inner surface of the wall and clamping the wall between the face plate and the arm.

The various aspects of the invention are also attained by providing a mounting bracket for mounting an electrical device within an opening in a wall. The mounting bracket comprises a support member having a face plate with a planar surface for contacting an outer surface of the wall. A side wall extends from the face plate for extending into the opening in the wall. A leg extends in a direction away from the face plate. The leg has a longitudinal channel. A pivotally mounted arm has a base received in the longitudinal channel of the leg. The arm is movable axially along the channel and is rotatable from a first position to a second position to clamp the wall between the face plate and the arm.

The various aspects of the invention are further attained by providing a mounting bracket for mounting an electrical device to a wall and within an opening in the wall. The mounting bracket comprises a one-piece unitary support member formed from a sheet material and having a face plate having a central opening. A mounting flange is coupled to the face plate and extends into the central opening for coupling to the electrical device. A pair of legs extend from and are perpendicular to the face plate. The arms have an outwardly facing longitudinal channel. A pivoting mounting arm is coupled to each of the legs. Each arm has a base received in a respective channel and is pivotable from a first retracted position to a second extended position extending outwardly from the central opening and substantially parallel to the face plate. The base of the mounting arm has an aperture extending parallel to the longitudinal channel. A threaded screw is coupled to the base for pivoting the arm and moving the arm along the channel.

These and other features of the invention will become apparent from the following detailed description of the invention, which in conjunction with the drawings, disclose various embodiments of the invention.

BRIEF DESCRIPTION OF THE DRAWINGS

The following is a brief description of the drawings, in which.

DETAILED DESCRIPTION OF THE INVENTION

The present invention is directed to a mounting bracket that can be attached to a wall for supporting an electrical device. The invention is particularly directed to a mounting bracket that can be received in an opening in a wall and securely attached thereto for supporting an electrical device on the wall and for mounting an electrical box to a wall.

Referring to the drawings, the mounting bracket 10 of the invention includes a support member 12 having legs 14 extending from the support member and coupling arms 16 coupled to legs 14. Arms 16 are coupled to legs 14 to provide limited pivotable movement with respect to legs 14 and axial movement along the length of legs 14 for attaching to a wall surface.

Figure 1:
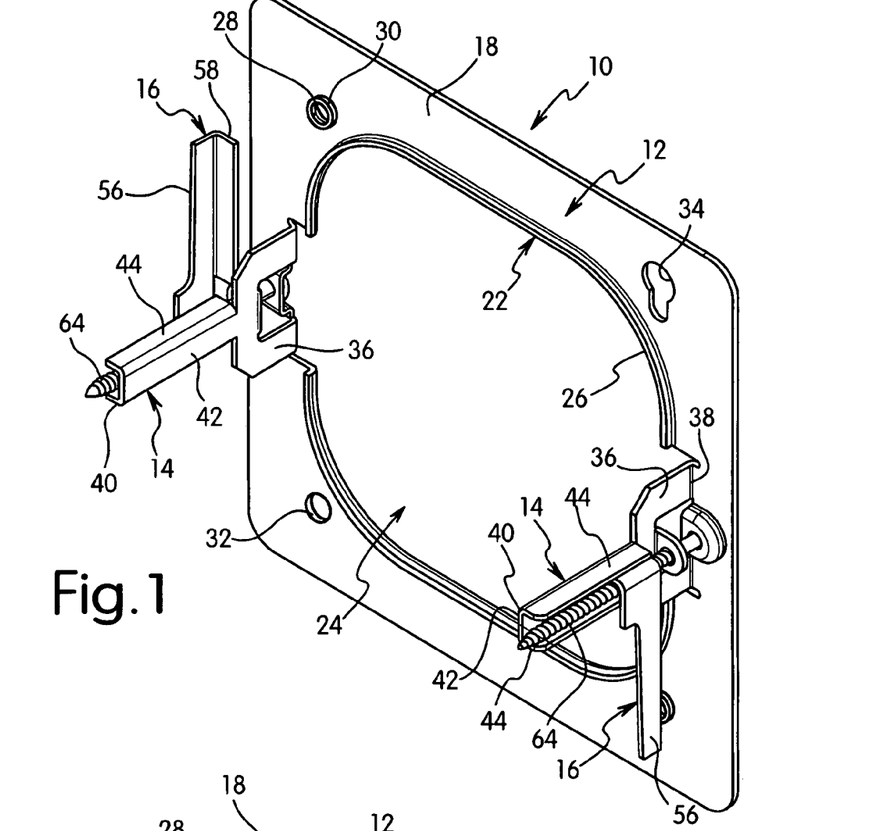
FIG. 1 is a perspective view of the mounting bracket showing the movable mounting arms in a first embodiment of the invention.

Referring to FIGS. 1-5, a first embodiment of the invention shows mounting bracket 10 having support member 12 with a substantially planar face plate 18. In this embodiment, face plate 18 has a substantially square configuration with an outer edge 20 and an inner edge 22 defining a central opening 24. A lip 26 is formed around central opening 24 and coupled to face plate 18 as shown in FIG. 1. In the embodiment illustrated, lip 26 extends substantially perpendicular to face plate 18 and extends from face plate 18 a distance to strengthen and resist bending of face plate 18. Face plate 18 includes a pair of punched holes 28 having a collar 30 for receiving a screw or other fastener. In one embodiment, collar 30 can have internal threads for receiving a screw. In the embodiment illustrated, punched holes 28 are positioned at opposite corners of face plate 18. A circular hole 32 and a keyhole shaped hole 34 are provided on opposite corners as shown in FIG. 1.

Legs 14 are integrally formed with face plate 18 and are cut or punched from the material that is removed from face plate 18 to form central opening 24. In the embodiment illustrated, legs 14 are formed on opposite sides of central opening 24 and extend substantially perpendicular to face plate 18 in the same direction as lip 26. Legs 14 include a base 36 forming a flange that is coupled to face plate 18 by a fold line 38. A substantially U-shaped channel extends from base 36 in a direction substantially parallel to base 36. U-shaped channel 40 has a bottom wall 42 connected to base 36 and a pair of side walls 44 coupled to bottom wall 42 to form an outwardly facing channel 46. As shown in FIG. 1, channel 46 is open outwardly toward outer edge 20 of face plate 18. In the embodiment illustrated, legs 14 defined by base 36 and U-shaped channel 40 are spaced outwardly from inner edge 22 of central opening 24 and inwardly of outer edge 20 of face plate 18.

A tab 48 is cut or punched from base 36 and bent outwardly substantially parallel to face plate 18 and perpendicular to base 36. Tab 48 is formed with a central hole 50 that is aligned with channel 46.

Arms 16 are received within a respective U-shaped channel of legs 14. Arms 16 have a base 52 with a substantially cylindrical configuration having an axial passage 54. Arms 16 are also defined by a first planar portion 56 extending tangentially from base 52. A flange 58 extends along one edge of first portion 56 substantially perpendicular to first portion 56. Arms 16 are formed from a single piece of material such as steel with one end curled to form the circular base and bent along a fold line to form flange 58.

Figure 3:
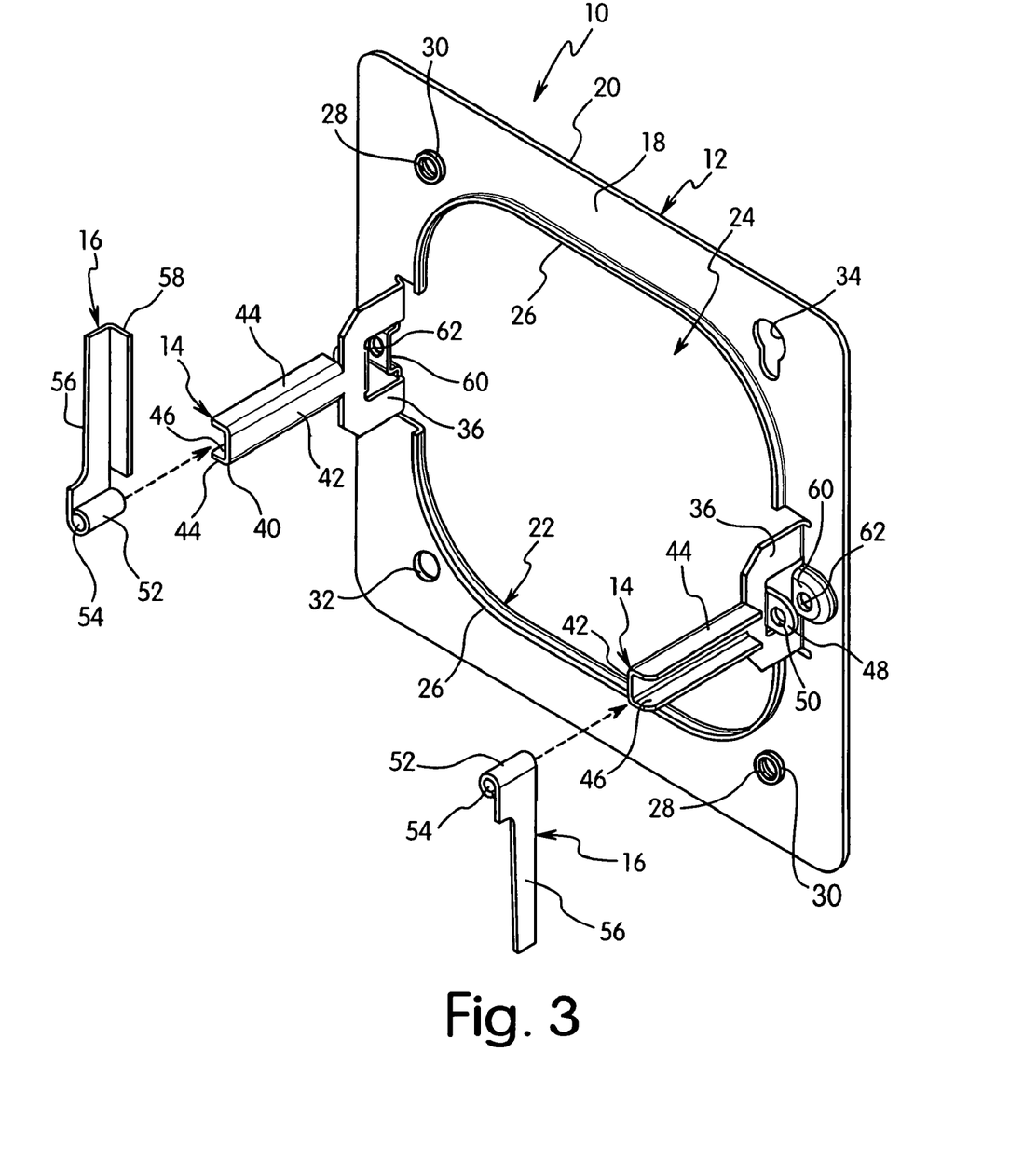
FIG. 3 is a bottom side perspective view of the support plate of the mounting bracket of FIG. 1 without the movable mounting arms removed.
Figure 4:
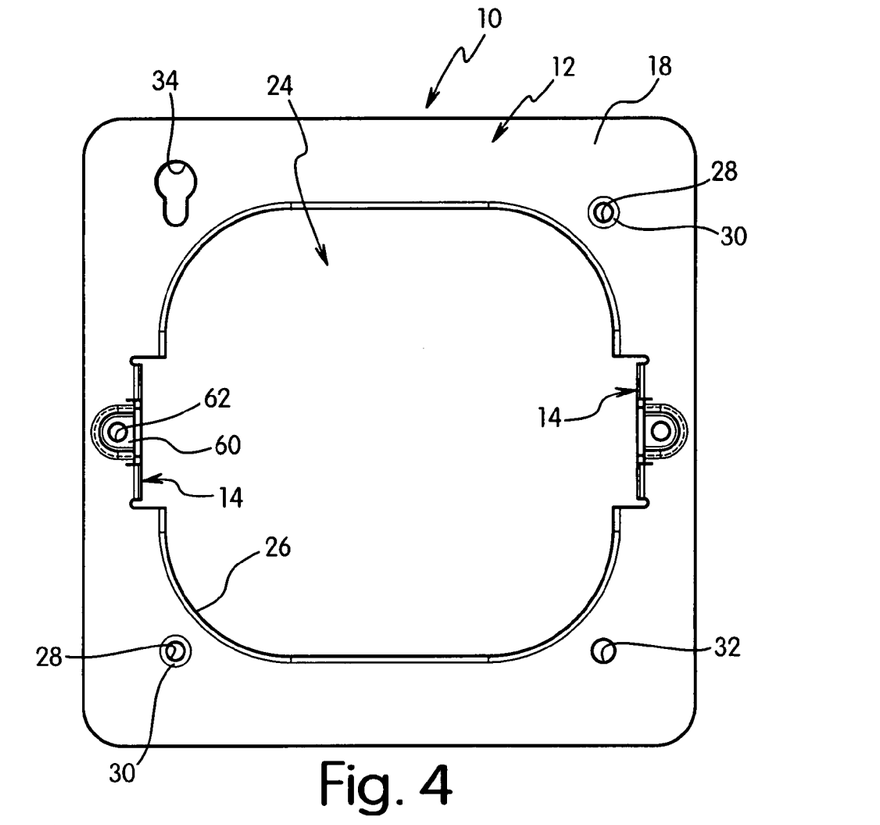
FIG. 4 is a bottom plan view of the support plate of FIG. 1.

As shown in FIG. 3, face plate 18 has a punched and recessed portion 60 with an aperture 62. A threaded screw 64 extends through aperture 62 of recessed portion 60 and hole 50 in tab 48 and extends axially along channel 46. Screw 64 is threaded into base 52 of the respective arm 16 so that base 52 is mounted to legs 14 and within channel 46. First portion 56 of arm 16 is offset from the axial center of base 52 to provide limited pivotal movement of arm 16 within channel 46 by rotation of screw 64. Arm 16 is movable from a first retracted position shown in FIG. 1 where first portion 56 of arm 16 contacts one of the side walls 44 of channel 46 so that arm 16 lies in a plane substantially parallel to outer edge 20 of face plate 18. Arm 16 is pivoted by rotation of screw 64 to the position shown in FIG. 5 where first portion 56 contacts the other side wall of channel 46 to extend arm 16 outwardly in a direction substantially perpendicular to the edge of face plate 18.

Figure 2:
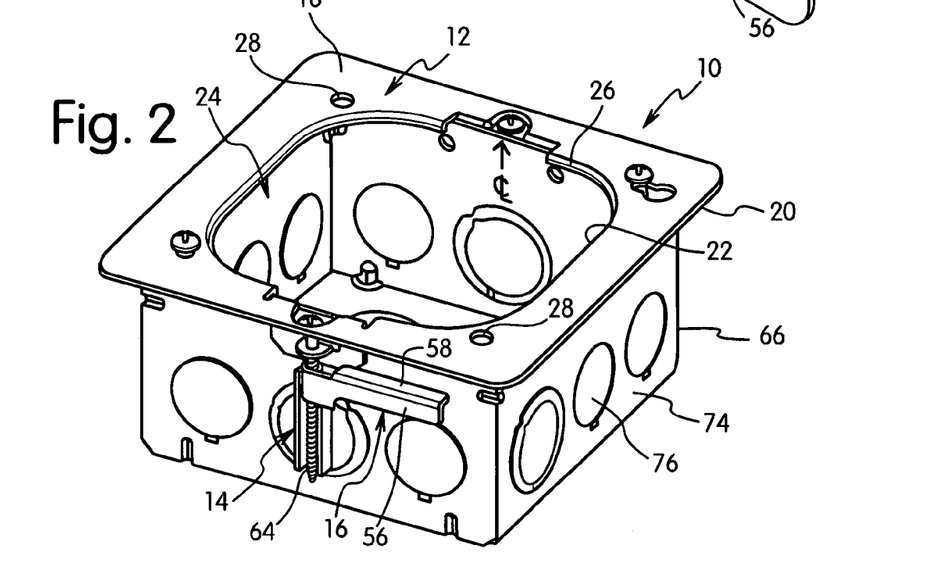
FIG. 2 is a perspective view of the mounting bracket of FIG. 1 attached to an electrical box.
Figure 5:
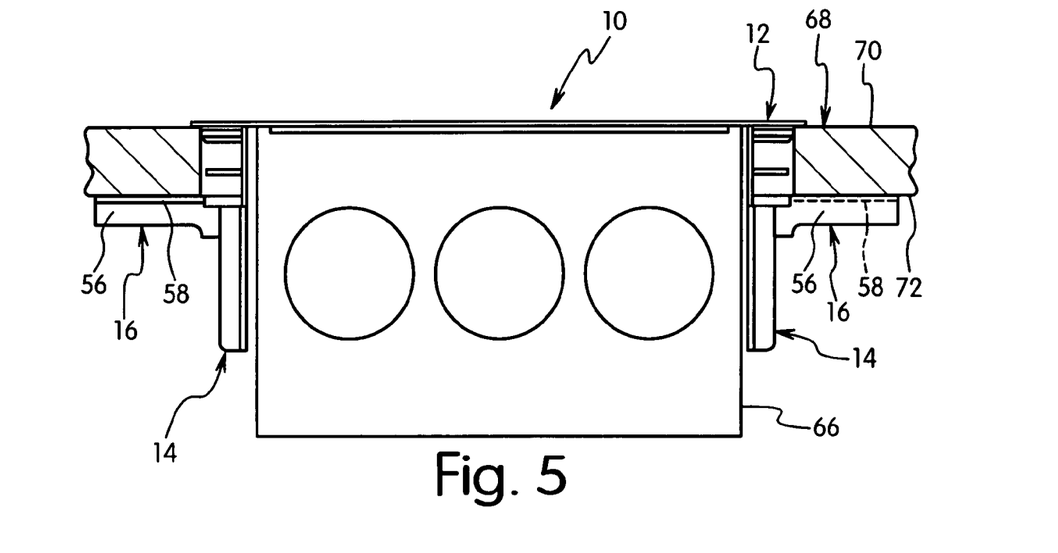
FIG. 5 is a side view of the mounting bracket attached to a wall.

Referring to FIG. 2, mounting bracket 10 is coupled to an electrical box 66 for enclosing wiring and appropriate connections for an electrical device. Face plate 18 in this embodiment has a shape and dimension to accommodate and support a fire alarm to form a fire alarm mounting. The fire alarm (not shown) is attached to face plate 18 by screws threaded into holes 28. In use, legs 14 are inserted into an opening formed in a wall 68. Typically, the opening in wall 68 has a dimension to accommodate electrical box 66 and arms 16 and a dimension less than the outer dimension of face plate 18. In this manner, face plate 18 contacts the outer surface 70 as shown in FIG. 5. Mounting bracket 10 is inserted through the opening in wall 68 with arms 16 in the position shown in FIG. 2. Once inserted into the opening of wall 68, screws 64 are rotated in a clockwise direction to pivot arms 16 from the position shown in FIG. 2 outwardly to the position shown in FIG. 5. The first portion 56 of arm 16 contact side wall 44 of channel 46 to limit rotation of arms 16 within channel 46. Continued rotation of screw 64 which is threaded into base 52 draws the arm 16 toward an inner surface 72 of wall 68 until arm 16 contacts inner surface 72, thereby clamping wall 68 between face plate 18 and arm 16 as shown in FIG. 5. Base 52 of arm 16 is movable axially along the longitudinal length of channel 46 to enable arm 16 to contact wall 68. In this manner, mounting bracket 10 can be attached to a wall 68 without requiring electrical box 66 to be attached to a wall stud or other structural support.

Electrical box 66 is a standard electrical box having side walls 74 with a plurality of knock-outs or pry-out plugs 76 for feeding electrical wiring into the cavity of the electrical box 66. Generally, the electrical box is made of steel or other metal and includes a plurality of tabs having threaded apertures for receiving mounting screws to attach mounting bracket 10 to electrical box 66.

In preferred embodiments, support member 12 and arms 16 of mounting bracket 10 are formed from a sheet of steel or other rigid material. Typically, the components are cut and stamped from a sheet of steel and folded or punched to the shape shown in FIG. 1. Legs 14 are preferably integrally formed with face plate 18 as a one-piece unit formed from a single sheet of steel.

Figure 6:
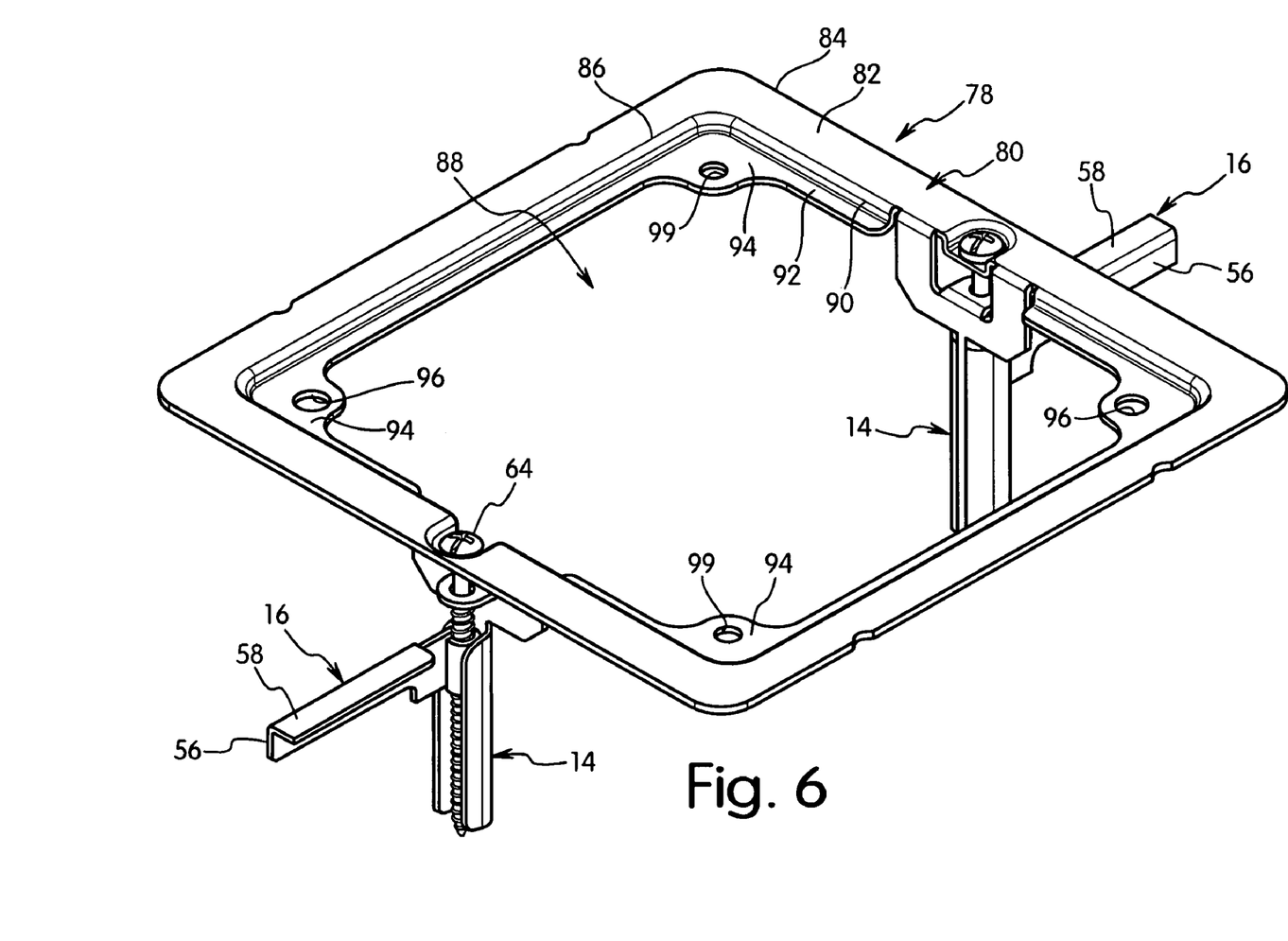
FIG. 6 is a perspective view of the mounting bracket in a second embodiment of the invention.
Figure 7:
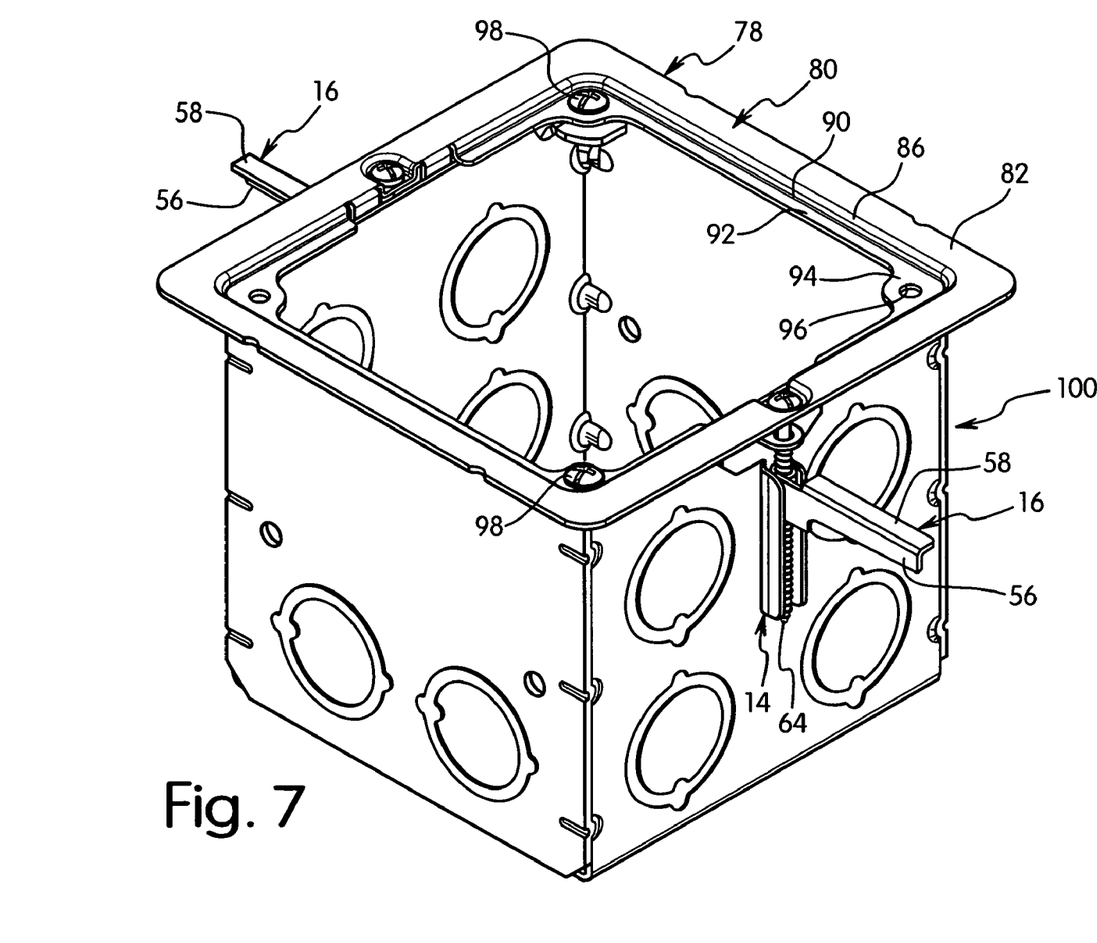
FIG. 7 is a perspective view of the mounting bracket of FIG. 6 showing the mounting bracket attached to an electrical box.

EMBODIMENT OF FIGS. 6 AND 7

FIGS. 6 and 7 show a second embodiment of the invention which is similar to the first embodiment. Therefore, identical components are identified by the same reference number.

Referring to FIG. 6, mounting bracket 78 includes a support member 80 having a face plate 82. Face plate 82 has a substantially square configuration with an outer edge 84 and an inner edge 86. Inner edge 86 defines a substantially square central opening 88.

Support member 80 is formed with a lip 90 formed with the inner edge 86 and extends in a downward direction substantially perpendicular to face plate 82. An inwardly extending flange 92 extends from lip 90 inwardly into central opening 88. Lip 90 extends downwardly a distance to recess flange 92 with respect to face plate 82.

Flange 92 includes tabs 94 extending inwardly from each corner of face plate 82. Tabs 94 include clearance holes or apertures 96 in opposite corners for receiving a screw 98 to attach mounting bracket 78 to an electrical box 100. Apertures 99 are provided in the remaining corners. Apertures 99 are extruded holes with internal threads for mounting an electrical device to flange 92. Flange 92 is dimensioned to couple to an electrical device such as a fire alarm device.

Mounting bracket 78 operates in a manner similar to the embodiment of FIGS. 1-5. As shown in FIG. 7, electrical box 100 is coupled to mounting flange 92. Initially, arms 16 are positioned parallel to the side wall of electrical box 100 and parallel to the side edge of face plate 82. The electrical box is inserted into an opening formed in a wall member with the legs 14 and arms 16 extending into the opening so that face plate 82 is positioned flush against an outer surface of the wall structure. Screw 98 is then rotated in a clockwise direction to pivot the arm 16 to the position shown in FIG. 7 where the side portion of arm 16 contacts the side wall of the U-shaped channel to limit rotational movement of the arm 16 within the channel. Screw 98 is tightened to draw the arm 16 toward the inner face of the wall structure as in the previous embodiment to clamp the wall structure between the inner face of the face plate 82 and arm 16.

Figure 8:
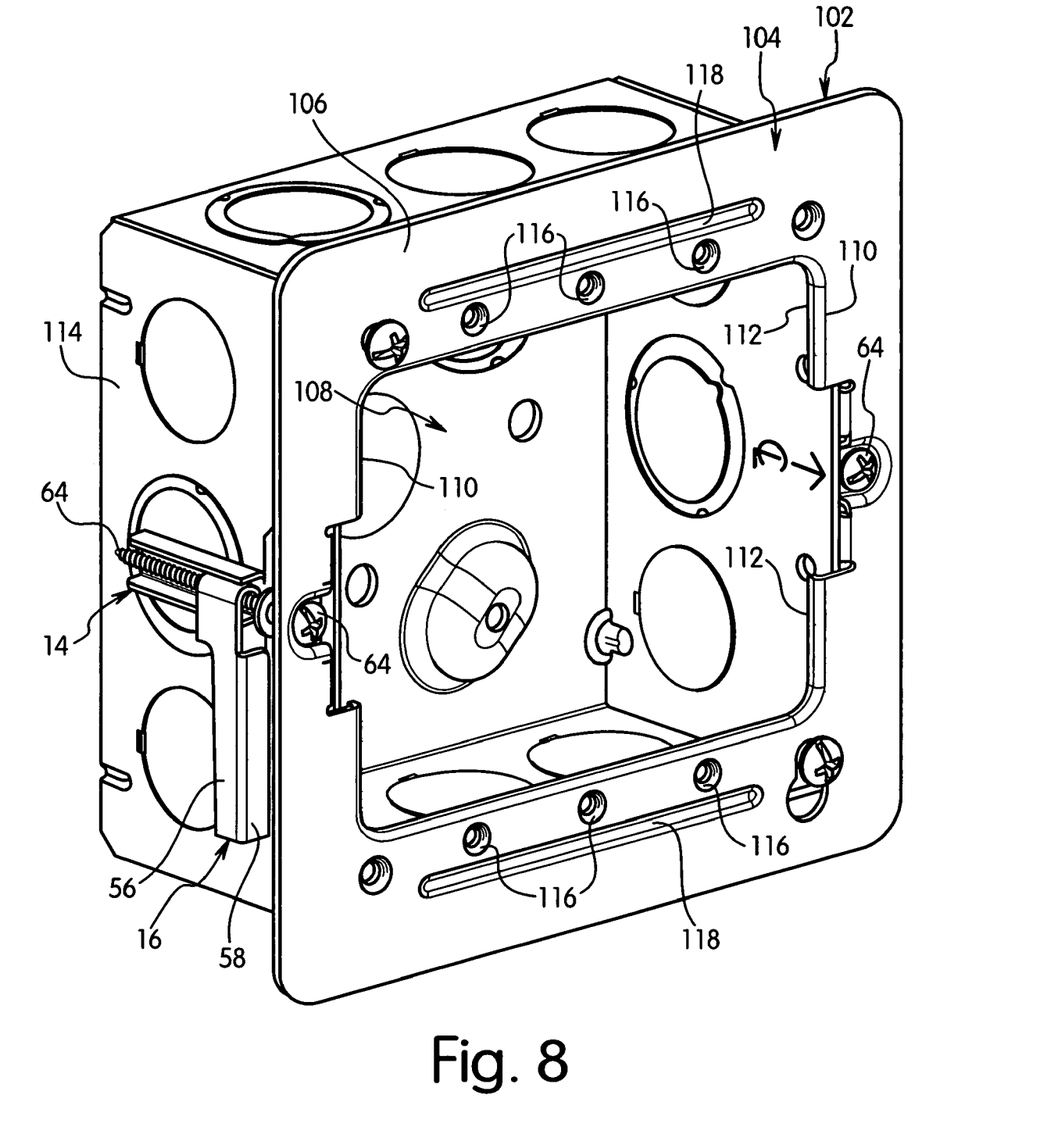
FIG. 8 is a top side perspective view of the mounting bracket in a third embodiment attached to an electrical box.
Figure 9:
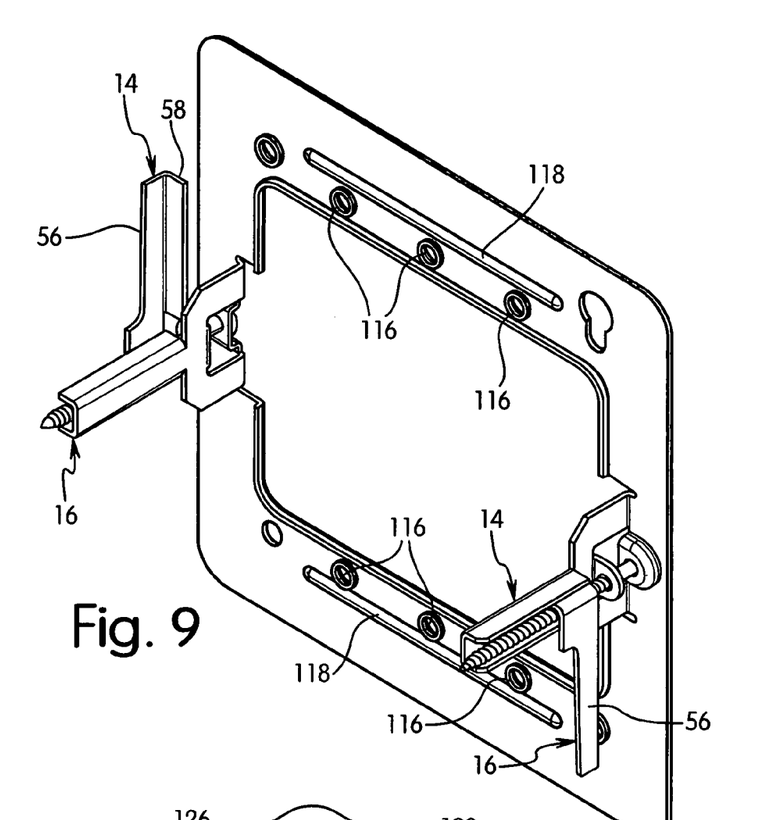
FIG. 9 is a bottom side perspective view of the mounting bracket of FIG. 8.

EMBODIMENT OF FIGS. 8 AND 9

FIGS. 8 and 9 show another embodiment of the invention. This embodiment is similar to the previous embodiments in that mounting bracket 102 includes a support member 104 having a face plate 106 and legs 14 for receiving movable arm 16.

As shown in FIG. 8, face plate 106 has a substantially square central opening 108 formed by an inner edge 110 of face plate 106. Inner edge 110 is formed with an inwardly extending lip 112 having a dimension to fit within the opening of electrical box 114. A plurality of punched holes 116 are formed on opposite sides of central opening 108 for receiving screws to mount an electrical device to face plate 106. In the embodiment illustrated, an elongated recess 118 extends parallel to the inner edge 110 on opposite sides of central opening 108 to strengthen face plate 106 and inhibit bending of face plate 106 when an electrical device is mounted thereto.

Mounting bracket 102 is operated in a similar manner to the previous embodiment. Arms 16 are initially positioned adjacent the side wall of the electrical box as shown in FIG. 8. Electrical box 114 is then inserted into an opening formed in a wall so that face plate 106 contacts an outer surface of the wall and arms 16 are positioned inside the wall cavity. The screws are rotated in a clockwise direction to pivot arm 16 outwardly and draw the arms toward the face plate 106 to contact the inner surface of the wall structure, thereby coupling the mounting bracket and electrical box to the wall.

Figure 10:
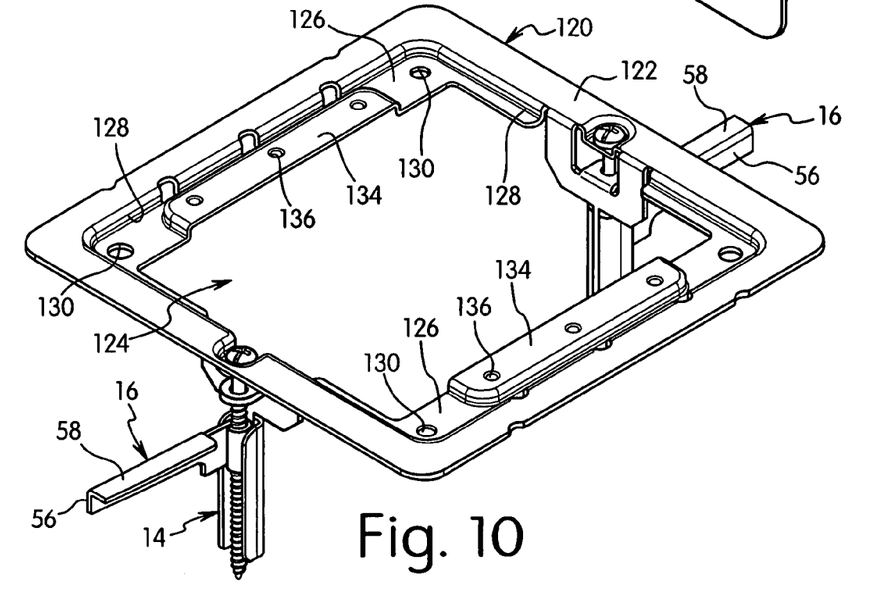
FIG. 10 is a top side perspective view of the mounting bracket in a fourth embodiment of the invention.
Figure 11:
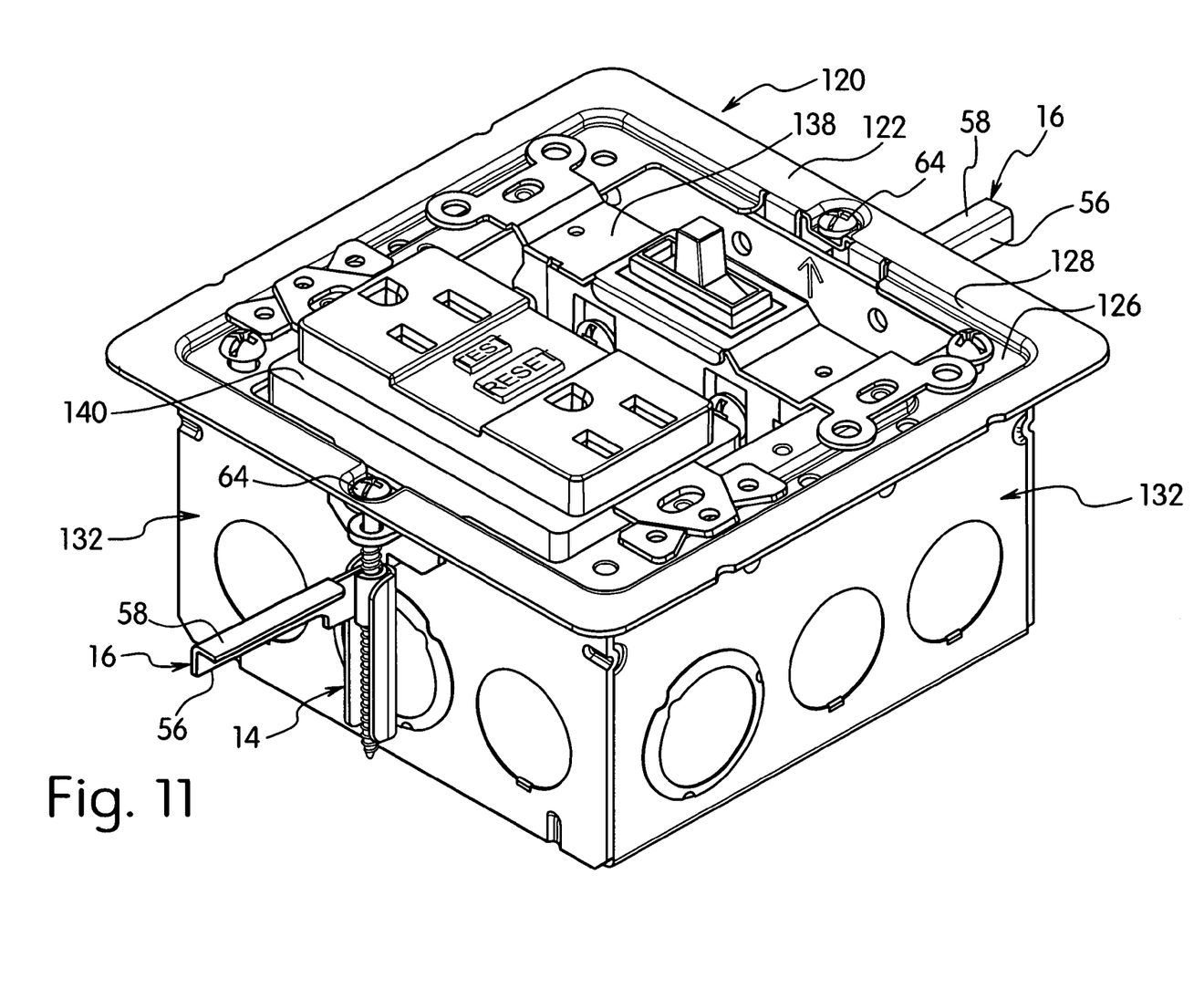
FIG. 11 is a top side perspective view of the mounting bracket of FIG. 10 attached to an electrical box and showing the electrical devices mounted to the support plate.

EMBODIMENT OF FIGS. 10 AND 11

FIGS. 10 and 11 show another embodiment of the invention where mounting bracket 120 includes a face plate 122 having a central opening 124. As in the previous embodiments, legs 14 are integrally formed with face plate 122 and arms 16 are mounted within the U-shaped channel of legs 14.

Referring to FIG. 11, a flange 126 extends radially inwardly into central opening 124 and is spaced from face plate 122 to form a recess. Flange 126 is integrally formed with a lip 128 that is integrally formed with face plate 122. As shown in FIG. 10, lip 128 extends substantially perpendicular to face plate 122 and flange 126 extends substantially perpendicular from lip 128.

Flange 126 is provided with a plurality of apertures 130 formed in each of the four corners for receiving a screw or other fastener to couple mounting flange 120 to an electrical box 132 as shown in FIG. 11. Flange 126 includes a raised embossed portion 134 on opposite sides of face plate 122. Raised portion 134 includes a plurality of mounting holes 136 for mounting an electrical device as shown in FIG. 11. Typically, holes 36 are threaded to receive a screw for attaching an electrical device to mounting bracket 120. As shown in FIG. 11, the electrical device can be a switch 138 and a duplex electrical receptacle 140.

In each of the embodiments, the mounting bracket is formed from a single piece of sheet steel that is cut and stamped to form the desired shape. In particular, the mounting bracket is stamped or pressed to form the face plate and the mounting flange for supporting the electrical components. The legs are cut from the portion of the sheet material that is removed to form the central opening and the legs are bent substantially perpendicular to the face plate. The base of the legs is cut to form the tab that extends outwardly substantially perpendicular to the base. A hole is punched in the tab to form a guide for the screw that moves the arms in a rotational and linear direction with respect to the legs. Tabs on the legs are bent to form a substantially U-shaped channel facing outwardly to receive the base of the arms and to limit rotational movement of the arms while allowing linear movement of the arms along the U-shaped channel.

While various embodiments have been chosen to illustrate the invention, it will be understood by those skilled in the art that various changes and modifications can be made without departing from the scope of the invention as defined in the appended claims.

What is claimed is:

1. A mounting bracket for mounting to a wall or ceiling, said mounting bracket comprising:
   a one-piece support member having a face plate with a first planar surface for contacting an outer surface of a wall, the face plate having a central opening defining an inner edge of said face plate;
   at least two legs extending substantially perpendicular away from said face plate and being positioned on opposite sides of said central opening, said legs being integrally formed with said inner edge of said face plate;
   a pivotally mounted arm coupled to each of said legs, each said arm being movable between a first retracted position and a second extended position for engaging an inner surface of the wall and clamping the wall or ceiling between said face plate and said arm.

2. The mounting bracket of claim 1, wherein said face plate is adapted for supporting an electrical device.

3. The mounting bracket of claim 1, wherein said face plate is adapted for supporting an electrical box.

4. The mounting bracket of claim 1, wherein said support member further comprises
   a mounting flange extending inwardly into said central opening and having a plurality of screw mounting holes for coupling an electrical box to said mounting flange.

5. The mounting bracket of claim 4, wherein said mounting flange is recessed with respect to an outer face of said face plate.

6. The mounting bracket of claim 1, wherein each of said legs and have a longitudinal channel, said arm being slidably received in said channel.

7. The mounting bracket of claim 6, wherein each of said arms have a base with an aperture therein, and said mounting bracket further comprising a screw extending along each said leg and received in said aperture of said base of said arm for moving said arm in a longitudinal direction to said leg and for pivoting said arms between said first position and said second position.

8. The mounting bracket of claim 7, wherein each said arm has a substantially L-shaped cross-section with a first flange lying in a plane substantially parallel to said longitudinal direction of said respective leg and a second flange extending in a plane substantially parallel to said face plate.

9. The mounting bracket of claim 8, wherein said first flange of said arms is offset with respect to said base, and said channel of said respective leg has an open side facing outwardly with respect to said central opening, said open side cooperating with said arm to limit rotation of said arm with respect to said leg.

10. The mounting bracket of claim 7, wherein said face plate has a guide hole aligned with each of said legs for receiving said screw.

11. The mounting bracket of claim 10, wherein each said leg comprises a first flange extending perpendicular from said face plate, said longitudinal channel being coupled to said first flange, and a second flange extending from said first flange substantially parallel to said face plate and having a guide hole for receiving a respective screw.

12. A mounting bracket for mounting in an opening in a wall, said mounting bracket comprising:
   a one-piece unitary support member having a face plate with a planar surface for contacting an outer surface of the wall, a side wall extending from said face plate for extending into the opening in the wall, and at least two legs extending in a direction away from said face plate, each of said legs having a longitudinal channel; and
   a pivotally mounted arm having a base received in said longitudinal channel of each of said legs, each said arm being movable axially along said respective channel and being rotatable from a first position to a second position to clamp the wall between the face plate and each arm.

13. The mounting bracket of claim 12, further comprising a mounting flange extending parallel to said face plate and being coupled to said side wall and having a plurality of apertures for receiving mounting screws for coupling an electrical box to said mounting flange.

14. The mounting bracket of claim 12, further comprising a screw aligned with said channel of each of said legs, said base of said arm having an aperture receiving said screw and wherein rotation of said screw rotates said arm between said first and second positions and moves said arm longitudinally with respect to said channel.

15. The mounting bracket of claim 12, wherein each of said arms includes a first flange extending substantially parallel to said channel of said legs and being offset with respect to said base, and a second flange extending substantially parallel to said face plate.

16. The mounting bracket of claim 12, wherein each of said legs extend substantially perpendicular to said face plate.

17. The mounting bracket of claim 12, wherein said face plate has an aperture aligned with each of said legs for receiving said screw.

18. The mounting bracket of claim 17, wherein each of said legs further comprise a tab extending parallel to and spaced from said face plate, said tab having a guide hole for receiving said screw and being aligned with said aperture in said face plate and said channel.

19. The mounting bracket of claim 12, wherein said face plate includes a central opening, and where said side wall extends substantially perpendicular to said face plate from an inner edge of said central opening.

20. The mounting bracket of claim 12, wherein said face plate includes a central opening and wherein said legs are formed from material removed from said face plate to form said central opening.

21. The mounting bracket of claim 12, wherein said face plate is adapted for supporting an electrical box.

22. The mounting bracket of claim 12, wherein said face plate is adapted for supporting an electrical device.

23. The mounting bracket of claim 12, wherein said legs include a bottom wall and two parallel side walls connected to said bottom wall by fold lines to define said longitudinal channel.

24. A mounting bracket for mounting within an opening in a wall, said mounting bracket comprising:

a one-piece unitary support member formed from a sheet material and having a face plate with a central opening, a mounting flange coupled to said face plate and extending into said central opening, a pair of legs extending from and perpendicular to said face plate, each of said legs having an outwardly facing longitudinal channel;

a pivoting mounting arm coupled to each of said legs, each arm having a base received in a respective channel and being pivotable from a first retracted position to a second extended position extending outwardly from said central opening and substantially parallel to said face plate, said base of said mounting arm having an aperture extending parallel to said longitudinal channel, and a threaded screw coupled to said base for pivoting said arm and moving said arm along said channel.

25. A mounting bracket of claim 24, wherein said face plate has an aperture aligned with each said leg for receiving said screw.

26. A mounting bracket of claim 25, wherein said support member further comprises a tab parallel to and spaced from said face plate and having a guide hole aligned with each said aperture of said face plate and with each said channel of said legs for receiving said screw.

27. A mounting bracket of claim 26, wherein each of said legs include a flange, said flange being coupled to an inner edge of said central opening, and wherein said tab is integrally formed with said flange.

28. A mounting bracket of claim 27, wherein said tab is cut from said flange and folded along a fold line to be substantially perpendicular to said flange.

* * * * *